Feb. 10, 1931. J. MALY 1,792,024
HACK SAW
Filed June 30, 1930 2 Sheets-Sheet 1
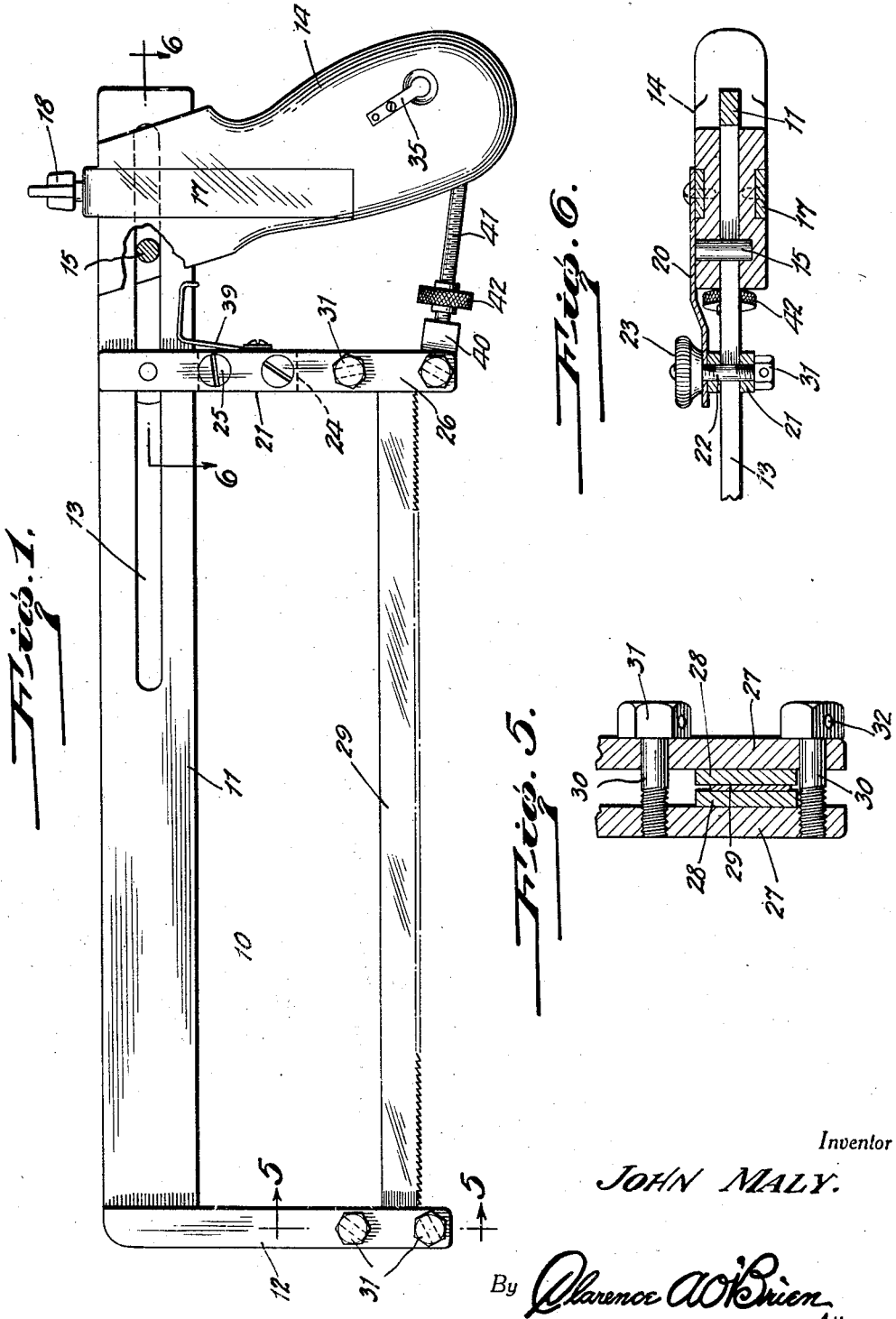
Inventor
JOHN MALY.
By Clarence A. O'Brien
Attorney

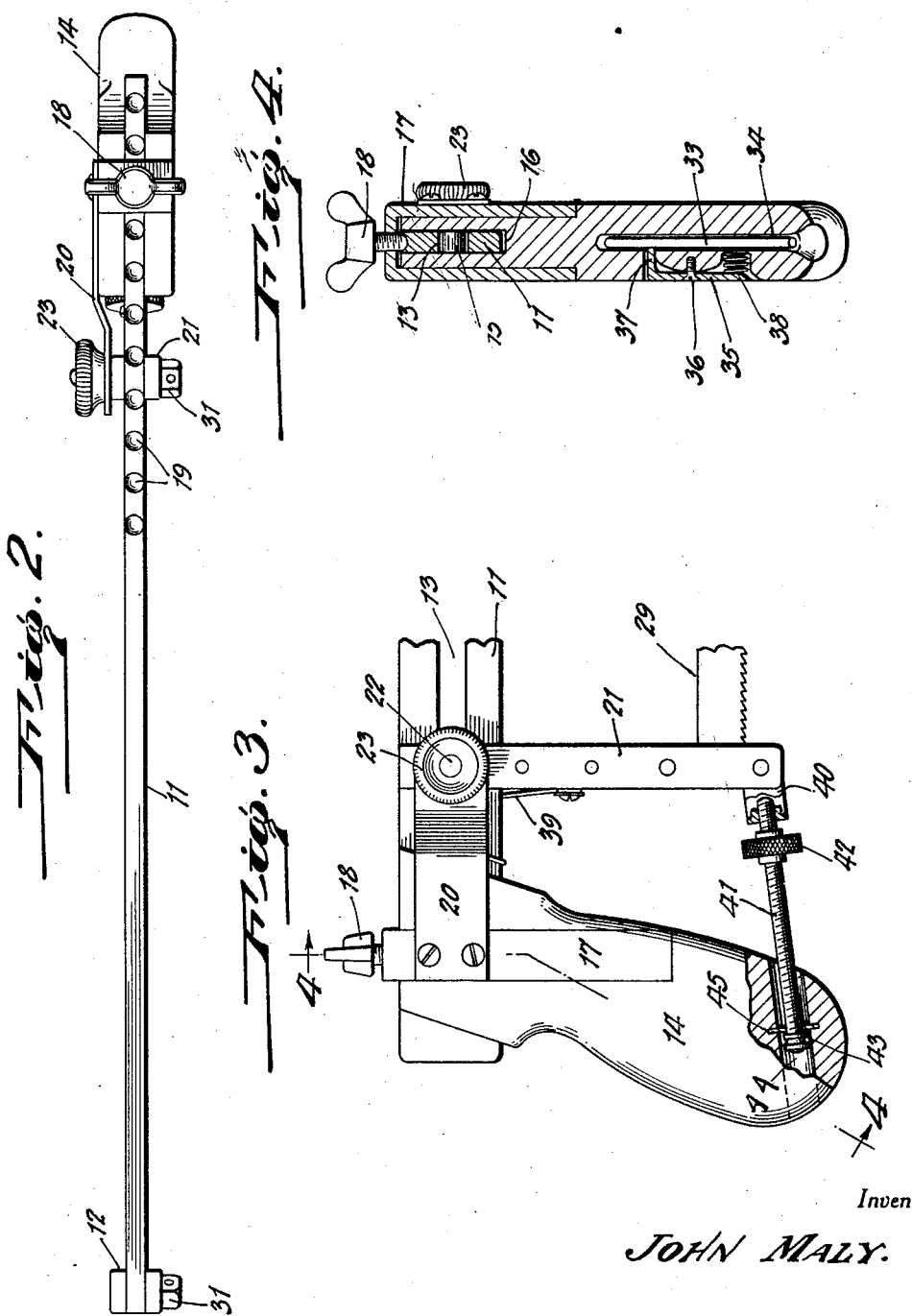

Patented Feb. 10, 1931

1,792,024

UNITED STATES PATENT OFFICE

JOHN MALY, OF NEW YORK, N. Y.

HACK SAW

Application filed June 30, 1930. Serial No. 464,953.

This invention relates to improvements in hack saws, and more particularly to adjustable hack saw frames.

The primary object of the invention is to provide an adjustable hack saw frame capable of receiving and supporting hack saw blades of different lengths, and means associated therewith for utilizing broken hack saw blades. It will be appreciated that the usual hack saw blade is provided with openings at opposite ends which accommodate pins on the frame, but in the event of the blade breaking, which often happens in use, there is no way to again secure one of the broken pieces in the frame for further use, unless the user happens to have a punch of a size to punch new holes to receive the pins. At present the pieces of broken hack saw blades are discarded, although the teeth may be in good condition, therefore it is the main purpose of my invention to utilize the hack saw blade pieces without repunching the same.

Another object of the invention is the provision of a hack saw frame in which the opposite ends of the blade are securely held in clamped position between sets of clamping jaws.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a side elevational view of my improved hack saw frame showing a blade in position therein.

Figure 2 is a top plan view of the same.

Figure 3 is a fragmentary side elevational view with parts broken away of the handle end of the frame looking at the side opposite that shown in Figure 1.

Figure 4 is a vertical sectional view on the line 4—4 of Figure 3.

Figure 5 is a vertical transverse sectional view on the line 5—5 of Figure 1.

Figure 6 is a horizontal sectional view on the line 6—6 of Figure 1.

Referring to the drawings by reference characters, the numeral 10 designates my improved hack saw frame in its entirety which includes a longitudinal bar member 11 having an arm 12 extending from one end thereof in a direction at right angles to the length of the same. The bar 11 is slotted adjacent its other end as at 13 for a purpose to be presently explained, and slidable upon the bar 11 is a handle member 13. Carried by the handle member 13 and extending through the slot 13 is a pin 15 adapted to guide the handle member in its movement to adjusted position. The top of the handle member 14 is slotted as at 16 to accommodate the bar 11 as clearly shown in Figure 4 of the drawing. A metal inverted U-shaped strap 17 has its legs countersunk in opposite sides of the handle member 14, while the bight portion overlies the top edge of the bar 11 and has a clamping thumb screw 18 threaded therein for seating in spaced recesses 19 provided in the top face of the bar 11, and as shown in Figure 2 of the drawings. Secured to one side of the handle member 14 and extending substantially parallel to the bar 11 is a plate 20 to which an arm 21 is pivotally connected by means of a pivot bolt 22. The bolt 22 is carried by the arm 21 and extends through the slot 13 of the bar 11 and threaded to the extending free end of the bolt is a clamping nut 23. By tightening up on the nut 23, the arm 21 may be held against swinging movement and by loosening the same, the arm may be swung upon its pivot.

The pivoted arm 21 is constructed of two pieces of material held in spaced relation by a spacer block 24, there being screws or other fastening elements 25 passing through the arm sections and block. Although I have described the arm 21 as being constructed of two pieces of material, the same may be formed in one piece, and bifurcated to accommodate the bar 11 and to provide resilient clamping jaws 26. The same may be said of the stationary arm 12 which may be constructed of two like pieces of material secured together, or wherein the free end may be bifurcated as shown in Figure 5 to provide spaced clamping jaws 27. The inner faces of the jaws 27 and 26 are provided with brass jaw plates 28 or other like soft material so as to provide frictional gripping surfaces between which the opposite ends of the hack saw blade 29 is clamped. The sets of jaws 26 and 27 are held in clamping position by threaded bolts 30 respectively disposed on opposite sides of the blade 29 as best seen in Figures 1 and 5. The threaded ends of the shanks of the bolts 30 screw into threaded openings provided in one of the jaw sections while the said bolt passes freely through the opposite jaw. The clamping bolts are provided with flat faced heads 31 having sockets or openings 32 passing transversely therethrough for accommodating an instrument whereby the clamping bolts may be tightened or loosened as desired. The instrument for insertion into the sockets or openings 32 is illustrated in Figure 4 of the drawing, and is in the nature of a pin 33 which is normally housed in a recess 34 provided in the handle 14, the said recess opening through the lower end of the handle for the insertion and removal of the pin thereinto. The pin is held within the recess by a catch member 35 countersunk in one side of the handle and pivoted thereto as at 36. One end of the catch member 35 is provided with a bill 37, while the opposite or tail end is engaged by one end of an expansion spring 38. The spring 38 tends to press the bill end 37 of the catch member in engagement with the pin 33 to jam the same against the opposite wall of the recess 34. By depressing the tail the bill end may be lifted away from the pin whereupon the latter will drop from the recess and may be inserted in the sockets or openings 32 for turning the clamping bolts 30.

For the purpose of urging the pivoted arm 21 in a direction toward the stationary arm 12, I provide a wire spring 39 which is fixedly secured to the spacer block 24, while the free end of the spring engages the under side of the longitudinal bar 11. This spring tends to normally move the arm 21 toward the arm 12 but permits swinging of the arm 21 in a direction toward the handle 14 when it is desired to insert one end of the hack saw blade 29 between the jaws 26, it being understood that the handle member 14 is first moved to the desired adjusted position.

Carried by one of the clamping bolts 30 for the jaws 26 is a U-shaped link 40 with which one end of a threaded rod 41 engages, the said rod having a manipulating member 42 fixedly mounted thereon. The opposite end of the rod 41 carries a head 43 which is slidable in a recess 44 provided in the lower end of the handle member 14. The head 43 is engageable with the stop 45 for limiting movement of the arm 21 against the action of the spring 39, but which rod is free to move in an opposite direction when the arm 21 is swung toward the handle to facilitate the insertion of one end of the hack saw blade between the jaws 26. After the ends of the hack saw blade 29 have been secured between the jaws 26 and 27, the rod 41 may be turned by manipulating the member 42 to maintain the parts in taut position.

From the foregoing description, it will be seen that the frame may be adjusted longitudinally to accommodate hack saw blades of different lengths, and that it is necessary to punch holes in the ends of the blade in order to facilitate the attachment of the same to the frame. It is only necessary to loosen the clamping bolts 30 and insert the ends of the blade between the jaw plates 28 of the respective sets of jaws 26 and 27, whereupon the bolts may be tightened up to compress the resilient jaws into engagement with the ends of the blade. By this arrangement pieces of broken hack saw blades may be utilized for further use which with the present type of frame is impossible due to the fact that it is the practice to provide openings in the ends of the blade to connect with pins carried by the arms of the frame. My improved frame will save the expense of inserting new blades every time the blade is broken and no tools or wrenches are required for preparing the frame for receiving the hack saw blade.

While I have shown and described what I consider to be the most desirable embodiment of my invention, it will be understood that various changes in construction may be resorted to if desired, and I do not limit myself to the exact structural details herein set forth, nor to anything less than the whole of my invention, limited only by the appended claims.

Having thus described the invention, what I claim as new and desire to secure by Letters Patent is:—

1. A hack saw frame comprising a longitudinal bar member, an arm at one end thereof and extending at right angles thereto, a handle slidably mounted on said bar member, a second arm pivotally carried by said handle, means for securing said handle in a fixed position of adjustment, spring means acting upon said second arm to urge the same in a direction toward said first mentioned arm, means for limiting movement of said pivoted arm against the action of said spring means to normally position said pivoted arm substantially parallel to said first mentioned arm, and blade clamping means provided on both of said arms for supporting a hack saw blade therebetween.

2. A hack saw frame comprising a longitudinal bar member, an arm at one end thereof and extending at right angles thereto, a handle slidably mounted on said bar member, a second arm pivotally carried by said handle, means for securing said handle in a fixed position of adjustment, spring means acting upon said second arm to urge the same in a direction toward said first mentioned arm, means for limiting movement of said pivoted arm against the action of said spring means to normally position said pivoted arm substantially parallel to said first mentioned arm, an adjustable screw rod connecting the said pivoted arm with said handle, and blade clamping means provided on both of said arms for supporting a hack saw blade therebetween.

3. A hack saw frame comprising a longitudinal bar having a longitudinal slot therein, a fixed arm extending from one end of said bar at right angles to the length thereof, a handle slidably mounted on said longitudinal bar, a pin carried by said handle and extending through said slot, a second arm pivotally supported by said handle, clamping means for securing said handle in adjusted position relative to said bar, a spring carried by said second arm and bearing against said bar to urge said pivoted arm in a direction toward said first arm, means for limiting the swinging movement of said pivoted arm against the action of said spring, and blade clamping means carried by the free ends of said arms.

In testimony whereof I affix my signature.

JOHN MALY.